United States Patent
Liao et al.

(10) Patent No.: US 10,230,619 B2
(45) Date of Patent: Mar. 12, 2019

(54) MESSAGE PROCESSING METHOD AND SYSTEM IN MULTI-HOMING ACCESS OVERLAY NETWORK

(71) Applicant: ZTE CORPORATION, Shenzhen, Guangdong Province (CN)

(72) Inventors: Ting Liao, Shenzhen (CN); Xuehui Dai, Shenzhen (CN); Fangwei Hu, Shenzhen (CN)

(73) Assignee: XI'AN ZHONGXING NEW SOFTWARE CO., LTD., Xi'An, Shaanxi (CN)

( * ) Notice: Subject to any disclaimer, the term of this patent is extended or adjusted under 35 U.S.C. 154(b) by 184 days.

(21) Appl. No.: 14/762,473

(22) PCT Filed: Sep. 11, 2013

(86) PCT No.: PCT/CN2013/083318
§ 371 (c)(1),
(2) Date: Jul. 22, 2015

(87) PCT Pub. No.: WO2014/114092
PCT Pub. Date: Jul. 31, 2014

(65) Prior Publication Data
US 2015/0365316 A1    Dec. 17, 2015

(30) Foreign Application Priority Data
Jan. 23, 2013    (CN) .......................... 2013 1 0024844

(51) Int. Cl.
*H04L 12/46* (2006.01)
*H04L 12/721* (2013.01)
*H04L 12/761* (2013.01)

(52) U.S. Cl.
CPC .......... *H04L 45/16* (2013.01); *H04L 12/4633* (2013.01); *H04L 45/44* (2013.01); *H04L 45/66* (2013.01)

(58) Field of Classification Search
CPC ......... H04L 45/66; H04L 45/44; H04L 45/16; H04L 12/4633
See application file for complete search history.

(56) References Cited

U.S. PATENT DOCUMENTS

2011/0235545 A1    9/2011    Subramanian et al.
2011/0299406 A1    12/2011    Vobbilisetty et al.
(Continued)

FOREIGN PATENT DOCUMENTS

CN    101039227 A    9/2007
CN    101577931 A    11/2009
(Continued)

OTHER PUBLICATIONS

H. Zhai et al., RBridge: Pseudo-Nickname, draft-hu-trill-pseudonode-nickname-04; TRILL Working Group, Internet-Draft, Dec. 10, 2012, pp. 1-22.

*Primary Examiner* — Philip J Chea
*Assistant Examiner* — Robert B McAdams
(74) *Attorney, Agent, or Firm* — Ling Wu; Stephen Yang; Ling and Yang Intellectual Property (57) ABSTRACT

A message processing method in a multi-homing access overlay network, comprising: when an edge device receives a data message from a multi-homing access bound interface, setting an identifier indicating that the data message is from multi-homing access in the overlay encapsulation performed on the data message, and sending the data message after the overlay encapsulation to the overlay network.

17 Claims, 4 Drawing Sheets

---

201 — When an edge device receives a data message from a multi-homing access bound interface, an identifier indicating that the data message is from the multi-homing access interface is encapsulated in the data message 202 — The edge device sends the data message after the overlay encapsulation at the overlay network 203 — After a far end edge device receives the data message sent by the edge device, if multiple data messages sent by the edge device carry the identifier and internal layer source MACs are same, then a mapping relationship between the same one MAC address and multiple overlay network device identifiers in the data message is stored

(56) References Cited

U.S. PATENT DOCUMENTS

| | | | |
|---|---|---|---|
| 2012/0027017 A1 | 2/2012 | Rai et al. | |
| 2012/0281700 A1* | 11/2012 | Koganti | H04L 49/60 370/392 |
| 2013/0148663 A1* | 6/2013 | Xiong | H04L 45/745 370/392 |
| 2014/0056298 A1* | 2/2014 | Vobbilisetty | H04L 12/46 370/355 |
| 2014/0071987 A1* | 3/2014 | Janardhanan | H04L 45/66 370/390 |
| 2014/0092748 A1* | 4/2014 | Bragg | H04L 12/4625 370/238 |
| 2014/0140199 A1* | 5/2014 | Vobbilisetty | H04L 45/583 370/217 |
| 2015/0195178 A1* | 7/2015 | Bhattacharya | H04L 45/745 718/1 |

FOREIGN PATENT DOCUMENTS

| | | |
|---|---|---|
| CN | 101778446 A | 7/2010 |
| EP | 2226973 A1 | 8/2010 |
| EP | 2282453 A1 | 9/2011 |

\* cited by examiner

```
                              +-+-+-+-+-+-+-+-+-+-+-+-+-+-+-+-+
                              | V | R |M|Op-Length| Hop Count |
+-+-+-+-+-+-+-+-+-+-+-+-+-+-+-+-+-+-+-+-+-+-+-+-+-+-+-+-+-+-+-+-+
|    Egress RBridge Nickname   |    Ingress RBridge Nickname   |
+-+-+-+-+-+-+-+-+-+-+-+-+-+-+-+-+-+-+-+-+-+-+-+-+-+-+-+-+-+-+-+-+
| Options...
+-+-+-+-+-+-+-+-+-+-+-+-+-
           TRILL Header
o  R (Reserved): 2 bits.
```

```
Bit(s)  Description
-----------------------

0-2     Crit.: Critical summary bits.
          0 CHbHG: Critical Hop-by-Hop extension(s) are present.
          1 CItzE: Critical Ingress-to-Egress extension(s) are present.
          2 CRSVe: Critical reserved extension(s) are present.

3-7     CHbH: Critical Hop-by-Hop extended flag bits.
8-13    NCHbH: Non-critical Hop-by-Hop extended flag bits.

14-16   CRSV: Critical Reserved extended flag bits.
17-20   NCRSV: Non-critical Reserved extended flag bits.

21-26   CItE: Critical Ingress-to-Egress extended flag bits.
27-31   NCItE: Non-critical Ingress-to-Egress extended flag bits.
```

| Target B-MAC (6 bytes) |
| Source B-MAC (6 bytes) |
| B-TAG (4 bytes, including a B-VID of 12 bits) |
| I-TAG (6 bytes, including an I-SID of 24 bits) |
| Target C-MAC (6 bytes) |
| Source C-MAC (6 bytes) |
| Customer frame VLAN label and payload (variable length) |

MESSAGE PROCESSING METHOD AND SYSTEM IN MULTI-HOMING ACCESS OVERLAY NETWORK

TECHNICAL FIELD

The present document relates to the communication field, and in particular, to a message processing method and system in a multi-homing access overlay network.

BACKGROUND

In order to realize supporting the large two-layer network of the data center, multiple overlay encapsulation technologies are proposed correspondingly, which perform the mapping study of the customer side MAC and the corresponding overlay access node identifier correspondingly through performing encapsulation and decapsulation of the original message in the edge device of the overlay network, and perform the corresponding control plane information interaction through the control plane in the overlay network, in order to carry the node identifier and interacting other information required to be carried for head encapsulation, such that it is realized that the overlay encapsulation of the original message is performed on the edge access device of the overlay network, and is then forwarded on the overlay intermediate transmission node, and reach the far end target edge device and perform the overlay decapsulation, therefore, the transmission of the original message in the large two-layer network is completed.

For example, the TRILL technology (Transparent Interconnection over Lots of Links) in the overlay encapsulation technology is a protocol used for solving the insufficient of the Spanning Tree protocol (STP) in the large-scale data center. In the two-layer network, the STP avoids the loop through blocking the redundant link, but it causes the waste (blocking) of the bandwidth of the redundant link at the same time. The TRILL solves the loop problem of the two-layer network through introducing the Intermediate System to Intermediate System (IS-IS) route protocol into the two-layer network, and realizes the multiple paths (or called the Equivalent Cost Multiple Path (ECMP)) of the two-layer network at the same time.

In the TRILL network (Campus), the device running the TRILL protocol is called as the route network bridge (RBridge), the device encapsulating the original message into the TRILL message at the entry of the network is called as the ingress route network bridge (RBridge), and the route network bridge decapsulating the TRILL data frame into the original data frame and forwarding to the end device at the exit of the TRILL network is called as the Egress route network bridge (RBridge). And the Egress RB will also study and record the information table {internal layer source MAC, Ingress_Nickname, ...} of the data frame at the same time. The edge devices of the current overlay network all perform one-to-one mapping relationship study when studying and storing the mapping of the MAC and the overlay network device identifier.

Meanwhile, the multi-homing access is a very common network deploying scene in the data center, where the terminal accesses the network through two or more than two links. The interfaces on the devices forming a group of multi-homing access are thought to join the same link aggregation group, and these devices are thought to be the member devices in the same link aggregation group. To the TRILL network specifically, the terminal accesses the TRILL network through multiple links and through multiple ingress RBs, these uplinks and the ingress RBridges make up one multi-homing group, and the RBridge device runs the link aggregation protocol (such as IEEE 802.1AX-REV). Because the message sent by the terminal may be encapsulated by different RBridges which belong to the multi-homing group, in this way, when the egress RBridge of the far end performs the MAC study, the frequently stir (called the flip-flop) of the Ingress-Nickname of the MAC table entry will occur since the same one MAC can only study the mapping of only one overlay network device identifier, which causes the instability of the MAC address table, and even will cause the disordered sequence of the returning flow and packet loss, resulting in the breakoff of the conversation.

Figure 1:
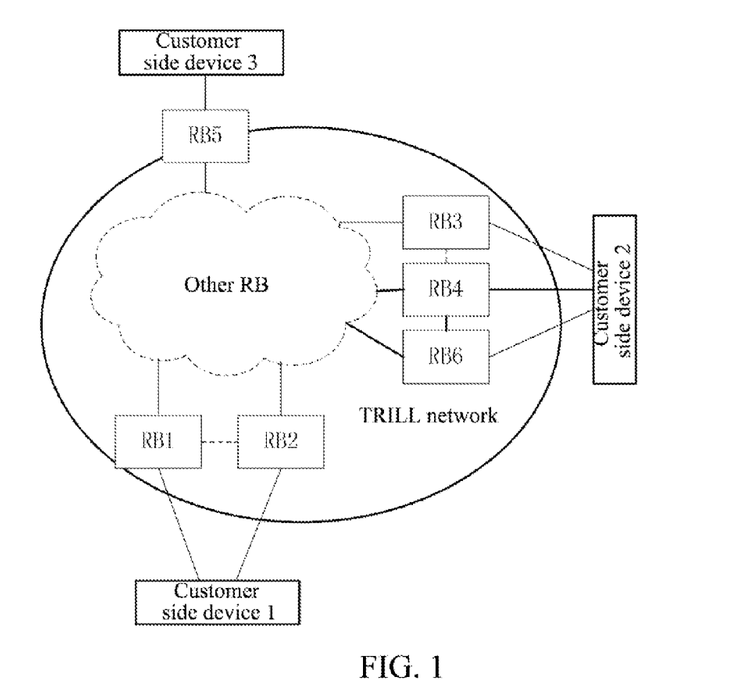
FIG. 1 is diagram one of a network scene provided by an embodiment of the present document.

As shown in FIG. 1, the customer side device 1 is connected to the RB1 and the RB2 at the same time, so the terminal accesses the links of the RB1 and the RB2 respectively and then forms one multi-homing group. When the customer side device 1 communicates with the customer side device 3, the two links of the RB1 and the RB2 connecting the customer side device 1 form the multi-homing binding relationship; the MAC1 on the customer side device 1 forms the TRILL encapsulation to reach the RB5 through the RB1 first, and the RB5 studies the mapping relationship between the nickname of the RB1 and the MAC1; when the flow of the MAC1 coming from the RB2 reaches the RB5, the RB5 will study the mapping relationship between the nickname of the RB2 and the MAC1, and covers the mapping relationship between the nickname of the RB1 and the MAC1. When there are MAC1 flow sent to the RB5 ceaselessly from the RB1 and the RB2 at the same time, the MAC1 related entries on the RB5 will be incessantly refreshed and covered. To other overlay networks, such as the SPB network, etc., when the terminal accesses multiple network bridges of the SPB network through the multi-homing access mode, the problem of the above-mentioned flip-flop of MAC table entry also exists.

SUMMARY

The present document provides a message processing method and system in a multi-homing access overlay network, and the technical problem required to be solved is how to avoid the flip-flop problem of the MAC entry.

In order to solve the above-mentioned technical problem, the present document provides the following technical scheme.

A message processing method in a multi-homing access overlay network comprises:

when an edge device receives a data message from a multi-homing access bound interface, setting an identifier indicating that the data message is from multi-homing access in overlay encapsulation performed on the data message, and sending the data message after the overlay encapsulation to the overlay network.

Preferably, the method further has the following characteristics: the method further comprises:

after a far end edge device receives the data message sent by the edge device, if multiple data messages sent by the edge device carry the identifier indicating from the multi-homing access and internal layer source MACs are same, then storing a mapping relationship between one same MAC address and multiple overlay network device identifiers in the data message.

Preferably, the method further has the following characteristics: the overlay network is a Transparent Interconnection over Lots of Links (TRILL) network or a shortest path bridge (SPB) network.

Preferably, the method further has the following characteristics:

in the TRILL network, a mapping relationship of multiple overlay network device identifiers in one same link aggregation group and one same MAC address refers to a mapping relationship of multiple route network bridge nicknames and the same MAC address; and in the SPB network, the mapping relationship of multiple overlay network device identifiers in one same link aggregation group and one same MAC address refers to a mapping relationship of multiple backbone media access control addresses and one same customer media access control address.

Preferably, the method further has the following characteristics: in the TRILL network, the identifier is represented through setting a particular bit of a reserved field; or, is represented by an expanded option indicated by a non-zero expansion of an Oplength field.

Preferably, the method further has the following characteristics: the option further carries member link information of the multi-homing access through an expansion type-length-value (TLV).

Preferably, the method further has the following characteristics: in the SPB network, the identifier is represented through setting a particular bit of a reserved field.

Preferably, the method further has the following characteristics: the method further comprises:

when the messages of the same MAC address received by the far end edge device have a message carrying the identifier, and also have a common message not carrying the identifier, then deleting an originally studied mapping relationship of the MAC address and the multiple network device identifiers, and studying and storing according to the mapping relationship of the MAC address and the network device in the common message.

An edge device, applied in an overlay network, comprises:

an encapsulation apparatus, configured to: when a data message is received from a multi-homing access bound interface, set an identifier indicating that the data message is from multi-homing access in overlay encapsulation performed on the data message; and a sending apparatus, configured to: send the data message after the overlay encapsulation to the overlay network.

Preferably, the edge device further has the following characteristics: the overlay network is a Transparent Interconnection over Lots of Links (TRILL) network or a shortest path bridge (SPB) network.

Preferably, the edge device further has the following characteristics: in the TRILL network, a mapping relationship of multiple overlay network device identifiers in one same link aggregation group and one same MAC address refers to a mapping relationship of multiple route network bridge nicknames and the same MAC address; and in the SPB network, the mapping relationship of multiple overlay network device identifiers in one same link aggregation group and one same MAC address refers to a mapping relationship of multiple backbone media access control addresses and one same customer media access control address.

Preferably, the edge device further has the following characteristics: in the TRILL network, the identifier is represented through setting a particular bit of a reserved field, or an expanded option indicated by a non-zero expansion of an Oplength field.

Preferably, the edge device further has the following characteristics: the option further carries member link information of the multi-homing access through an expansion type-length-value (TLV).

Preferably, the edge device further has the following characteristics: in the SPB network, the identifier is represented through setting a particular bit of a reserved field.

An egress edge device, applied in an overlay network, comprises:

a receiving apparatus, configured to: receive a data message carrying overlay encapsulation sent by an ingress edge device; and a storage apparatus, configured to: after the data message sent by the edge device is received, if multiple data messages sent by the edge device carry an identifier indicating that the data message is from multi-homing access and internal layer source MACs are same, then store a mapping relationship between one same MAC address and multiple overlay network device identifiers in the data message.

Preferably, the egress edge device further has the following characteristics: the overlay network is a Transparent Interconnection over Lots of Links (TRILL) network or a shortest path bridge (SPB) network.

Preferably, the egress edge device further has the following characteristics:

in the TRILL network, a mapping relationship of multiple overlay network device identifiers in one same link aggregation group and one same MAC address refers to a mapping relationship of multiple route network bridge nicknames and the same MAC address; and in the SPB network, the mapping relationship of multiple overlay network device identifiers in one same link aggregation group and one same MAC address refers to a mapping relationship of multiple backbone media access control addresses and one same customer media access control address.

Preferably, the egress edge device further has the following characteristics: the method further comprises:

a processing apparatus, configured to: connect to the storage apparatus, when the received messages of the same MAC address have a message carrying the identifier, and also have a common message not carrying the identifier, then delete an originally studied mapping relationship of the MAC address and the multiple network device identifiers, and study and store according to the mapping relationship of the MAC address and the network device in the common message.

A message processing system in a multi-homing access overlay network, comprising an edge device described according to any one of the above text and an egress edge device described according to any one of the above text.

The embodiment provided by the present document does not need to control the expansion of the plane protocol specially, while only need to carry the corresponding identifier in the data message head, of which the realization principle is simple.

PREFERRED EMBODIMENTS OF THE PRESENT DOCUMENT

The present document is described in detail with reference to the accompanying drawings and the specific embodiment hereinafter. It should be illustrated that, in the case of not conflicting, the embodiments in the present application and features in these embodiments can be combined with each other.

Figure 2:
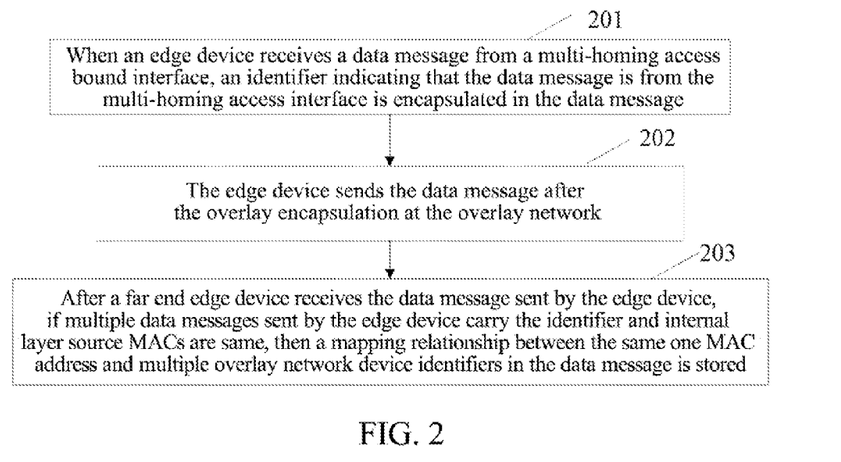
FIG. 2 is a flow chart of a method embodiment for message processing in a multi-homing access overlay network provided by the present document.

FIG. 2 is a flow chart of a method embodiment for processing messages in a multi-homing access overlay network provided by the present document. The method embodiment shown in FIG. 2 includes the following steps.

In step 201, when an edge device receives a data message from a multi-homing access bound interface, an identifier indicating that the data message is from multi-homing access is set in overlay encapsulation performed on the data message.

In step 202, the edge device sends the data message after the overlay encapsulation at the overlay network.

In step 203, after a far end edge device receives the data message sent by the edge device, if multiple data messages sent by the edge device carry the identifier and internal layer source MACs are same, then a mapping relationship between same one MAC address and multiple overlay network device identifiers in the data message is stored.

In order to solve the flip-flop problem of the MAC address table, through the method of identifying the terminal as the multi-homing access by using a special mark at the overlay head of the data plane, after receiving the data message of the identifier, the egress edge device of the far end stores the mapping relationship of multiple overlay network node identifiers in the same one link aggregation group and the customer side MAC address at the same time (for the TRILL network, it is to store the mapping relationship of multiple Rbridge nicknames and the same MAC address; for the SPB network, it is to store the mapping relationship of multiple B-MACs and the same one C-MAC), to solve the problem of the MAC skipping ceaselessly under the multi-homing access situation, and enable the return message of the far end edge device encapsulated with different node identifiers, thus realizing the load balancing from the far end to the local.

Wherein, the using of the mapping relation of the multiple overlay network device identifiers in the same link aggregation group and the same MAC address can include the following steps.

When receiving the mapping relationship of a certain overlay network device identifier and the MAC address in the link aggregation group, the far end edge device only updates the aging time of the mapping relationship corresponding to the overlay network device in the mapping relationship of the multiple overlay network device identifiers in the link aggregation group and the MAC address.

When multiple flows for a certain target MAC address are received and needed to send to the overlay network, if the MAC address is corresponding to multiple overlay network device identifiers in the same link aggregation group, then it can encapsulate different overlay message heads for different flows according to the multiple overlay network device identifiers to send to the overlay network.

The method embodiment of the present document is further described in detail through seven application examples hereinafter, including the follows.

Application example one: the specific implementation method one of the TRILL technology of the present document.

When the customer side device multi-homing accesses the TRILL network, there will be the corresponding multi-homing behavior perception in the interfaces of the multi-homing access boundary RB, and then when the data messages from these interfaces need to encapsulate and forward to the far end through the TRILL of the RB, the two links of the RB1 and the RB2 connecting the customer side device 1 as shown in FIG. 1 form the multi-homing binding relationship. If the customer side device is one host computer, when the MAC 1 of the customer side device 1 communicates with the MAC 3 of the customer side device 3, and when its application protocol of the upper layer has the flows of different applications sent out, different flows can be sent to different boundary route network bridges, and the boundaries RB1 and RB2 form the corresponding TRILL encapsulation message to be forwarded in the TRILL field; in order to solve the skipping problem of the mapping relationship of the MAC 1 on the far end RB5 to the nicknames of the RB1 and the RB2, through carrying the special identifier in the message encapsulation of the data plane to make the far end edge device establish the implementation different with the existing MAC study mechanism, when the same terminal performs the multi-homing access, the mapping table of the far end MAC address and the nickname will not be frequently covered, but it can be stored at the same time.

Figure 4:
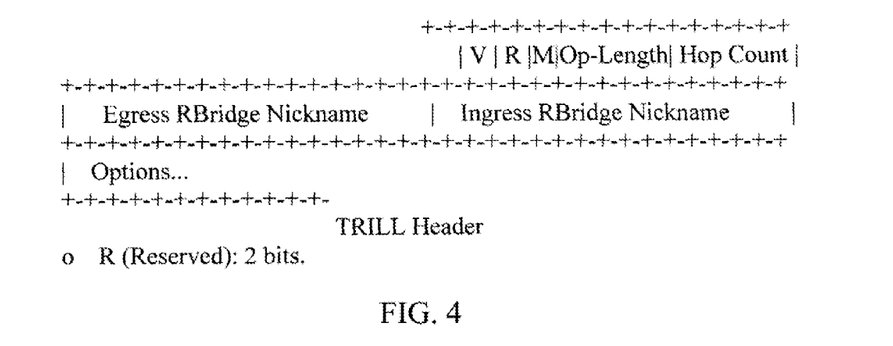
FIG. 4 is a diagram of a specific TRILL head in an embodiment of the present document.
Figure 5:
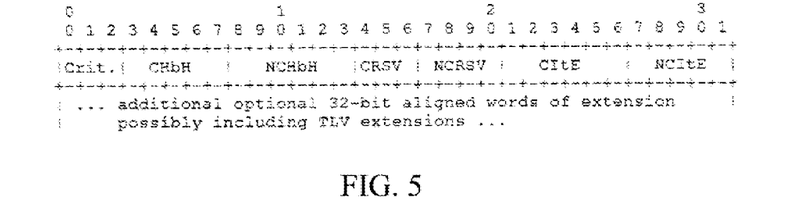
FIG. 5 is a definition graph one of a fixed option expansion attribute in an embodiment of the present document.
Figure 6:
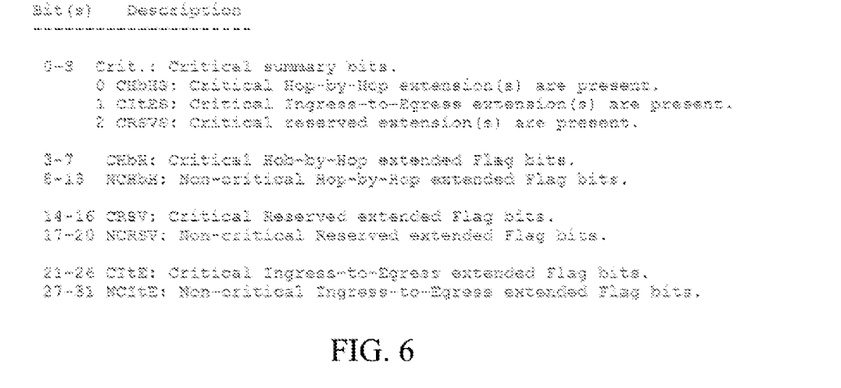
FIG. 6 is a definition graph two of a fixed option expansion attribute in an embodiment of the present document.

The specific implementation mode one is described as follows: as shown in FIG. 4, when the TRILL encapsulation is performed on the boundary RB, the MAC skipping problem under the multi-homing access scene is solved through the non-zero setting of the oplength (the value indicates the expansion head length value of the TRILL head, the unit is 4-byte length, wherein, according to the existing standard, the first 4 bytes indicate the fixed expansion of the head expansion attribute identifier). Through the illustration of the fixed expansion attribute of the first 4 bytes (referring to FIG. 5 and FIG. 6), the expansion is made to carry the LAG information of the multi-homing access information. Wherein, the CItES bit of the Crit of the expansion attribute needs to be set (that is, set as 1), which indicates that the LAG information TLV of the present document needs the egress-ingress process.

In the TRILL network, the identifier is represented by the bit of the reserved field or the oplength field in the data message, through carrying the member link information of the multi-homing access in the option of the data message, wherein, the member link information carried by the option includes the link aggregation group number and the RB nickname information of the member in the link aggregation group.

Figure 7:
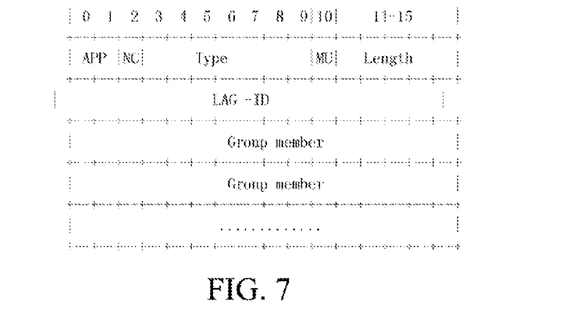
FIG. 7 is a specific expansion TLV diagram carried by LAG information in an embodiment of the present document.

FIG. 7 is a specific format of the LAG information TLV defined by the present document, wherein, the APP bit needs to be set as 11 to indicate that it is the expansion needing to be processed by the source and target nodes for the boundary encapsulation and decapsulation; the type is set as a fixed value, such as, 1, to indicate that it is the information expansion of the multi-homing access group; the length indicates the expansion TLV length, and the specific TLV content carries the multi-homing access LAG ID information of 16 bit and the Nickname information of other members in the same multi-homing access group, wherein, the LAG ID is the local LAG link aggregation group number.

Still in the scene of FIG. 1, the customer side device 1 communicates with the customer side device 3, the two links of the RB1 and the RB2 connecting the customer side device 1 form the LAG binding relationship of the multi-homing access, the MAC1 on the customer side device 1 forms the TRILL encapsulation and carries the non-zero special identifier of which the oplength is 2 through the RB1 first, makes the expansion attribute of the first 4 bytes be set through the CItES in the Crit through the option field expansion after the nickname in the TRILL head, to indicate that the expansion only needs the source and target nodes requiring the processing. The expansion TLV type value of the second 4 bytes indicates the carrying of the multi-homing access group information, and the specific TLV content carries the nickname information and the LAG ID information of the group member RB2. The message which carries the special identifier reaches the RB5, the RB5 studies the mapping relationship of the nickname of the RB1 and the MAC1, and analyzes the nickname value of the RB2 carried in the option in the LAG TLV according to the non-zero special identifier at the same time, and alternatively forms the mapping relationship of the nickname of the RB2 and the MAC1. And when receiving the TRILL carrying the head encapsulation identifier of the special identifier downloaded from the LAG member link interface of the RB2, the mapping relationship of the MAC1 and the nickname of the RB1, and stores the mapping relationship of the MAC1 and the nickname of the RB2 or updates the aging time of the mapping table entry from the MAC1 to the RB2 (if the entry is already established) at the same time. Therefore, two nickname mapping entries of the MAC1 are formed on the RB5, to make the MAC/VLAN not skip again.

The application example two: the production, update and deletion of the table entry of the specific implementation method one of the TRILL technology of the present document.

The two table entries described in the embodiment one are formed when issued to the forwarding plane chip, and when the chip has the ability of mapping multiple table entries of the same MAC/VLAN at the same time, these two table entries are issued at the same time, so that it realizes the load sharing by forming different head encapsulations for different flows of the same MAC/VLAN of the forwarding plane. Particularly, when the multiple flows of a certain target MAC address are received, if the target MAC address is corresponding to the multiple overlay network device identifiers in the same link aggregation group, then different encapsulations are performed on different flows according to the multiple overlay network device identifiers, and sent to the target MAC address.

When there is the message carrying the multi-homing access identifier, described by the above-mentioned embodiment, being sent to the RB5 ceaselessly, it is maintained and updated by using the current MAC refreshing mechanism. The update of the table entry is performed on the RB5 according to the message receiving situation related to the MAC; and when there is no MAC message being sent on the RB5, after the aging time is overdue, the table entry is made to be aged and deleted. And if there is also a carrying notification of the mapping relationship of the control plane at the same time, and if the priority of the control plane notification is higher than the locally studied priority, then the corresponding mapping relationship according to the control plane notification performs the refreshing and updating.

And when the message is decapsulated on the RB5, if it is found that there is the message with the MAC1 carrying the multi-homing special identifier coming over, and there is also the message not carrying the special identifier coming over, then it is processed according to the conflict situation. The conflict situation is processed as follows: when the messages of the same MAC1 have the sent out option expansion message of the multi-homing access identifier, and also have the sent out common messages, then the far end boundary RB thinks that the multi-homing relationship makes mistakes when analyzing the message; and the mapping relationship of the MAC 1 of the far end node with the nicknames of the RB1 and the RB2 formed by the multi-homing access relationship of the option expansion can be covered and refreshed by the mapping relationship of the MAC and the nickname in the common message at the same time.

When the MAC1 is moved from the RB1 and the RB2 to the customer side device 2 under the RB3, the RB4 and the RB6, because of the update of the group member relationship in the TRILL expansion head option in the new multi-homing access link group, if now it carries the LAG ID and the nickname information of other group members at the same time, then it needs the expansion length of two 4 bytes. When the far end RB5 studies the special TRILL encapsulation message, the mapping of the MAC1 to the RB3, the RB4 and the RB6 will be formed, and the original table entry of the MAC1 and the RB1 and the RB2 will be deleted meanwhile.

And when moving to the node without the LAG binding and the node sends out the common TRILL encapsulation message without the special identifier, as the conflict situation processing described under the present embodiment, the following common TRILL encapsulation message can cover the several-for-one nickname and MAC table entry which is formed originally.

When the member link within the multi-homing access group fails, for example, if there are originally two nodes as the multi-homing members exist, as shown in FIG. 1, when the access link of the customer side device 1 of the RB1 therein fails, then the RB2 selects to forward according to the common message after feeling the access of this member of the member group fails, and the new mapping table is generated according to the conflict situation on the RB5, to make the flow coming over from the far end forward normally only through the RB2. And if there are three original nodes as the LAG members exist, when one member link fails, then after the normal forwarding member device feels the failure, the failed member will be deleted in the carried option expansion information, therefore, the far end node will remove the binding relationship of the MAC and the invalid member after receiving the update flow encapsulation message.

The application example three: the specific implementation method two of the TRILL technology of the present document.

The specific implementation description is as follows: as shown in FIG. 4, when the boundary RB performs the TRILL encapsulation, the MAC skipping problem under the multi-homing access scene is solved through setting the bit in the two bits reserved. For example, these two bits are set as 01 to indicate that the terminal accesses through the LAG link; still in the scene of FIG. 1, the customer side device 1 communicates with the customer side device 3, the two links of the RB1 and the RB2 connecting to the customer side device 1 form the LAG binding relationship, and the MAC1 on the customer side device 1 forms the TRILL encapsulation carrying the special identifier to reach the RB5 through the RB1 first, and the RB5 studies the mapping relationship of the nickname of the RB1 and the MAC1; according to the special identifier, when there is the MAC flow, carrying the special identifier to the customer side device 3 under the RB5, of the MAC1 coming over from the RB2 to be forwarded to the RB5, the mapping relationship of the MAC1 to the RB2 is formed when keeping the original mapping relationship of the nickname and the MAC1 of the RB1 at the same time, therefore, two mapping entries of the nickname of the MAC1 are formed on the RB5.

The application example four: the production, update and deletion of the table entry of the specific implementation method two of the TRILL technology of the present document.

The table entry maintenance is mainly the same as described in the application example two, however, when the moving happens to other multi-homing access binding interfaces, for example, when the MAC1 moves from the RB1 and the RB2 to the customer side device 2 under the RB3, the RB4 and the RB6, because the LAG bit is also set, if it is also the 01 identifier which is carried, then the mapping of the MAC1 to the RB1, the RB2, the RB3, the RB4 and the RB6 will be formed on the far end RB5 at the same time; however, the moving has already happened at this moment and the RB1 and the RB2 cannot reach the MAC1 any more, therefore, when it is required to forward through the original message on the moved RB3, RB4 or RB6, the two bits of the special RESV fields are set as, such as, 10, which indicates that there is the moving happened; the original formed table entries of the MAC1 to the RB1 and the RB2 are deleted, and the newest mapping table entry is studied. The message sent out subsequently carries the 01 of the RB3 or the RB4 or the RB6 to indicate that the message accessed by the LAG continues to be transmitted according to the LAG procedure.

The application example five: the specific implementation application description one of the TRILL network of the present document.

Then when there are the different application flow messages on the far-end such as RB5 to be sent from the MAC2 to the MAC1, different Nickname encapsulation can be formed according to the table entry sent from the chip, so that load sharing is formed for the far end sending the messages to the customer side device at the multi-homing link side as well. And when it is realized with the method one, if the message is sent to the RB5 only through the RB1 in FIG. 1, but because it carries the member information RB2, the source MACs carried in the message can be reached through by the RB1 and RB2 by the RB5 at the same time only according to the message coming over from the RB1. When multiple flow reaching the MAC1 come over from the far-end, different Nicknames can be encapsulated to realize the load sharing of the same MAC/VLAN at the network side. When the message of a certain target MAC address is received, and if the target MAC address is corresponding to multiple overlay network device identifiers in the same link aggregation group, then the message of the target MAC address is sent according to the multiple overlay network device identifiers.

Figure 3:
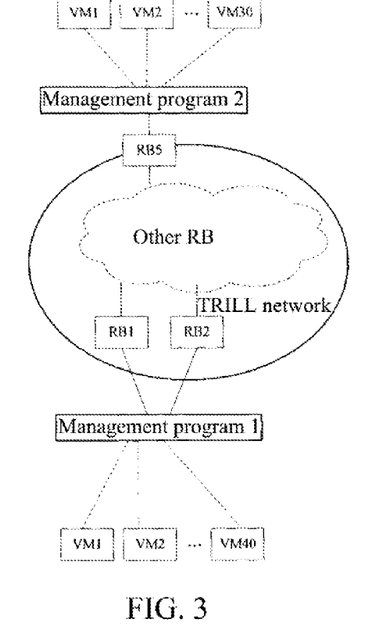
FIG. 3 is a diagram two of a network scene provided by an embodiment of the present document.

When the customer side device is one Hypervisor (management program), as shown in FIG. 3, which carries the encapsulated message, such as, the VXLAN, sent to the edge device, and the message received by the edge device will be continuously encapsulated only according to the outer layer MAC. By using the method of the present document, the load sharing of the flow of different VMs can be realized between the RB1 and the RB2 under the Hypervisor.

The application example six: the specific implementation description of the SPB network of the embodiment of the present document.

Figure 8:
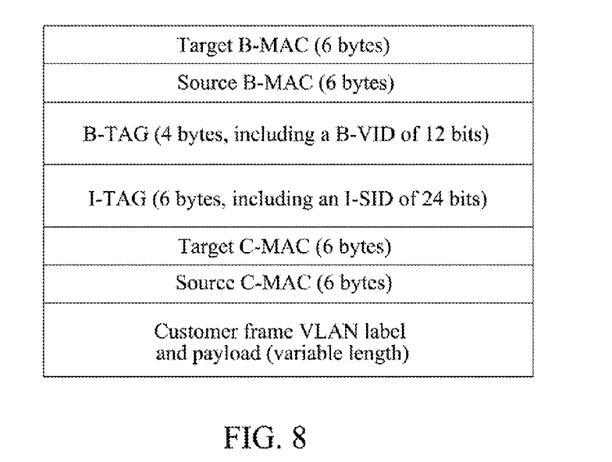
FIG. 8 is an encapsulation diagram of a SPB in an embodiment of the present document.
Figure 9:
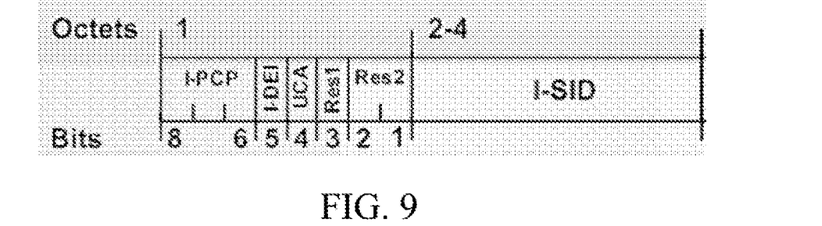
FIG. 9 is description graph of a specific field of I-TAG in an embodiment of the present document.

In the overlay encapsulation of the SPB network shown in FIG. 8, because the coming CMAC will form the mapping relationship with the BMAC, in order to solve the current carrying problem of the multi-homing access, the corresponding expansion can be performed through setting the resv1 field in FIG. 9. The identifier is expressed through the bit of the reserved field, and through carrying the member link information, having the link aggregation group number and the RB nickname information of the member in the link aggregation group, of the multi-homing access in the reserved field of the data message, so that it enables the realization of the study of the mapping relationship from the same one customer media access control address CMAC to multiple backbone media access control addresses BMAC in the far end edge device in the SPB network as described and shown in the above TRILL when there is the multi-homing access, to solve the skipping problem of the MAC when there is the multi-homing access of the SPB network and realize the load sharing of the returning message of the far end edge device at the same time.

The application example seven: the specific implementation description.

When the abilities of the chip in the network on different devices are different for the entry number of the same MAC/VLAN mapping, for example, the existing chip can only support one mapping on default, and when there is the demand on the load sharing of the returning message, the chip is required to expand to support multiple mappings; and it will not bring the compatibility problem by uniformly adopting the above-mentioned description method. When the multi-homing access is performed on the data center network, the deployment scheme should be unified; if the above-mentioned description method is confirmed, then the encapsulation notification of the data plane is uniformly adopted; when the receiving side of the far end analyzes the message carrying the special identifier, it is sent to the CPU for processing according to the special identifier, and forms the multiple mapping entries associated with the MAC which carries the special identifier at the same time. If the chip can only support the existence of one table entry of the same MAC, it is issued according to one fixed mapping entry therein which is issued and selected by its own algorithm finally, to solve the MAC skipping problem. If the chip can support multiple mapping table entries of the same MAC at the same time and certainly if the hardware study can be processed at the same time, there is no need to send to the software for processing, and multiple mapping entries are issued at the same time, therefore solving the MAC skipping problem and also making the returning message of the far end to form the load sharing correspondingly.

When there are the boundaries of more than two nodes forming the LAG binding, the present document can also be covered. And when the overlay encapsulation and decapsulation operates on the terminal, it can also be expanded and supported. The realization of the multi-homing access of other overlay networks can be realized according to this as well.

Figure 10:
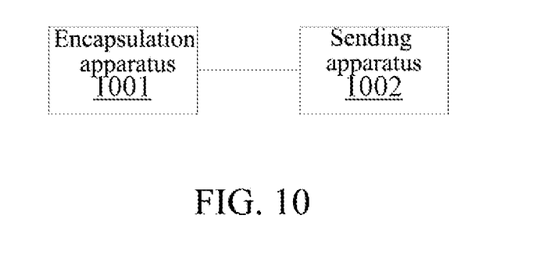
FIG. 10 is a structure diagram of a message processing system embodiment in a multi-homing access overlay network provided by the present document.

FIG. 10 is a structure diagram of the edge device embodiment provided by the present document. As shown in FIG. 10, the edge device is called the first edge device and applied in an overlay network, including the follows.

An encapsulation apparatus 1001 is configured to: when a data message is received from a multi-homing access bound interface, set an identifier indicating that the data message is from multi-homing access in overlay encapsulation performed on the data message; and a sending apparatus is configured to 1002: send the data message after the overlay encapsulation to the overlay network.

Wherein, the overlay network is a Transparent Interconnection over Lots of Links (TRILL) network or a shortest path bridge (SPB) network.

Wherein, in the TRILL network, the identifier is represented through setting a particular bit of a reserved field; or, the identifier is represented by an expanded option indicated by a non-zero expansion of an Oplength field.

Wherein, the option further carries member link information of the multi-homing access through an expansion type-length-value (TLV).

Wherein, in the SPB network, the identifier is represented through setting a particular bit of a reserved field.

In addition, the present document further provides an egress edge device, which is called the second edge device and applied in an overlay network, including the follows.

A receiving apparatus is configured to: receive a data message carrying overlay encapsulation sent by an ingress edge device; and a storage apparatus is configured to: after the data message sent by the edge device is received, if multiple data messages sent by the edge device carry an identifier indicating from multi-homing access and internal layer source MACs are same, then store a mapping relationship between one the multiple overlay network device identifiers in the same link aggregation group to which the data message belongs and the same MAC address.

Wherein, the overlay network is the TRILL network or the SPB network.

Wherein, in the TRILL network, a mapping relationship of multiple overlay network device identifiers in one same link aggregation group and one same MAC address refers to a mapping relationship of multiple route network bridge nicknames and the one same MAC address; and in the SPB network, the mapping relationship of multiple overlay network device identifiers in one same link aggregation group and one same MAC address refers to a mapping relationship of multiple backbone media access control addresses and one same customer media access control address.

Wherein, the edge device further includes:

a processing apparatus, configured to: connected to the storage apparatus, when the received messages of the same MAC address have a message carrying the identifier, and also have a common message not carrying the identifier, then delete an originally studied mapping relationship of the MAC address and the multiple network device identifiers, and study and store according to the mapping relationship of the MAC address and the network device in the common message.

In addition, the present document provides a message processing system in a multi-homing access overlay network, including a first edge device and a second edge device.

It can be understood by those skilled in the art that all or part of steps in the above-mentioned embodiment can be fulfilled by the computer program flow, and the computer program flow can be stored in a computer readable storage medium, and the computer program flow is executed on the corresponding hardware platform (such as a system, a device, an apparatus, a component, etc.), and includes one of the steps of the method embodiment or its combination when being executed.

Alternatively, all or part of the steps in the above-mentioned embodiments also can be implemented by the integrated circuits. Those steps can be made into integrated circuit modules one after another respectively, or multiple modules or steps therein are made into a single integrated circuit module for implementation. This way, the present document is not limit to any specific combination of the hardware and software.

Each device/function module/function unit in the above-mentioned embodiment can be implemented by the universal calculating apparatus, and they can be integrated in a single calculating apparatus, or distributed in the network made up by a plurality of calculating apparatus.

Each device/function module/function unit in the above-mentioned embodiment can be stored in a computer readable storage medium when it is implemented in the form of the software function module and is sold or used as an individual product. The above-mentioned computer readable storage medium can be a read only memory, a magnetic disk or an optical disk, etc.

The above description is only the specific embodiment of the present document and is not intended to limit the protection scope of the present document. Those modifications and replacements which can be thought out easily by those skilled in the art in the technical scope disclosed by the present document should be embodied in the protection scope of the present document. Therefore, the protection scope of the present document should be based on the protection scope described by the claims.

INDUSTRIAL APPLICABILITY

The edge device and system embodiments provided by the embodiment of the present document do not need to the expansion of the specific control plane protocol, while only need to carry the corresponding identifier in the head of the data message, of which the realization principle is simple.

What is claimed is:

1. A message processing method in a multi-homing access overlay network, comprising:
when an edge device receives a data message from a multi-homing access bound interface, setting an identifier in overlay encapsulation performed on the data message, the identifier indicates that the data message is from multi-homing access, and sending the data message after the overlay encapsulation to the overlay network; the method further comprising:
after a far end edge device receives the data message sent by the edge device, when data messages sent by multiple edge devices carry the identifiers indicating the data messages are from the multi-homing access and internal layer source MACs of the data messages are same, then storing a mapping relationship between one same MAC address and multiple overlay network device identifiers in the data messages; wherein in the multi-homing access overlay network, the edge device accesses the multi-homing access overlay network through two or more than two links.

2. The method according to claim 1, wherein, the overlay network comprises a Transparent Interconnection over Lots of Links (TRILL) network or a shortest path bridge (SPB) network.

3. The method according to claim 2, wherein, in the TRILL network, a mapping relationship of multiple overlay network device identifiers in one same link aggregation group and one same MAC address refers to a mapping relationship of multiple route network bridge nicknames and the one same MAC address; and in the SPB network, the mapping relationship of multiple overlay network device identifiers in one same link aggregation group and one same MAC address refers to a mapping relationship of multiple backbone media access control addresses and one same customer media access control address.

4. The method according to claim 2, wherein, in the TRILL network, the identifier is represented through setting a particular bit of a reserved field; or, the identifier is represented by an expanded option indicated by a non-zero expansion of an Oplength field.

5. The method according to claim 4, wherein, the option further carries member link information of the multi-homing access through an expansion type-length-value (TLV).

6. The method according to claim 2, wherein, in the SPB network, the identifier is represented through setting a particular bit of a reserved field.

7. The method according to claim 1, wherein, the method further comprises:
when the messages of the same MAC address received by the far end edge device comprise both a message carrying the identifier and also a common message not carrying the identifier, then deleting an originally studied mapping relationship of the MAC address and the multiple network device identifiers, and studying and storing a mapping relationship of the MAC address and the network device in the common message.

8. An edge device, applied in aft multi-homing access overlay network, comprising hardware performing instructions stored in a non-transitory computer readable medium which executes steps in following apparatuses:
an encapsulation apparatus, configured to: when a data message is received from a multi-homing access bound interface, set an identifier in overlay encapsulation performed on the data message, the identifier indicates that the data message is from multi-homing access; wherein in the multi-homing access overlay network, the edge device accesses the multi-homing access overlay network through two or more than two links; and
a sending apparatus, configured to: send the data message after the overlay encapsulation to the multi-homing access overlay network; wherein,
after a far end edge device receives the data message sent by the edge device, when data messages sent by multiple edge devices carry the identifiers indicating the data messages are from the multi-homing access and internal layer source MACs of the data messages are same, then storing a mapping relationship between one same MAC address and multiple overlay network device identifiers in the data messages; wherein, the multi-homing access overlay network comprises a Transparent Interconnection over Lots of Links (TRILL) network or a shortest path bridge (SPB) network;
wherein, in the TRILL network, the identifier is represented through setting a particular bit of a reserved field; or, the identifier is represented by an expanded option indicated by a non-zero expansion of an Oplength field; wherein, the option further carries member link information of the multi-homing access through an expansion type-length-value (TLV);
wherein, in the SPB network, the identifier is represented through setting a particular bit of a reserved field.

9. The edge device according to claim 8, wherein, the overlay network is a Transparent Interconnection over Lots of Links (TRILL) network or a shortest path bridge (SPB) network.

10. The edge device according to claim 9, wherein,
in the TRILL network, a mapping relationship of multiple overlay network device identifiers in one same link aggregation group and one same MAC address refers to a mapping relationship of multiple route network bridge nicknames and the one same MAC address; and
in the SPB network, the mapping relationship of multiple overlay network device identifiers in one same link aggregation group and one same MAC address refers to a mapping relationship of multiple backbone media access control addresses and one same customer media access control address.

11. The edge device according to claim 9, wherein, in the TRILL network, the identifier is represented through setting a particular bit of a reserved field, or an expanded option indicated by a non-zero expansion of an Oplength field.

12. The edge device according to claim 11, wherein, the option further carries member link information of the multi-homing access through an expansion type-length-value (TLV).

13. The edge device according to claim 10, wherein, in the SPB network, the identifier is represented through setting a particular bit of a reserved field.

14. An egress edge device, applied in a multi-homing access overlay network, comprising hardware performing instructions stored in a non-transitory computer readable medium which executes steps in following apparatuses:
a receiving apparatus, configured to: receive a data message carrying overlay encapsulation sent by an ingress edge device; and
a storage apparatus, configured to: after the data message sent by the edge device is received, when data messages sent by multiple edge devices carry the identifiers indicating the data messages are from the multi-homing access and internal layer source MACs of the data messages are same, then storing a mapping relationship between one same MAC address and multiple overlay network device identifiers in the data messages; wherein, the egress edge device further comprises:
a processing apparatus, configured to: connect to the storage apparatus, and when the received messages of the one same MAC address have both a message carrying the identifier and a common message not carrying the identifier, then delete an originally studied mapping relationship of the MAC address and the multiple network device identifiers, and study and store according to a mapping relationship of the MAC address and the network device in the common messages; wherein in the multi-homing access overlay network, the ingress edge device accesses the multi-homing access overlay network through two or more than two links.

15. The egress edge device according to claim 14, wherein, the multi-homing access overlay network is a Transparent Interconnection over Lots of Links (TRILL) network or a shortest path bridge (SPB) network.

16. The egress edge device according to claim 15, wherein,
- in the TRILL network, a mapping relationship of multiple overlay network device identifiers in one same link aggregation group and one same MAC address refers to a mapping relationship of multiple route network bridge nicknames and the one same MAC address; and
- in the SPB network, the mapping relationship of multiple overlay network device identifiers in one same link aggregation group and one same MAC address refers to a mapping relationship of multiple backbone media access control addresses and one same customer media access control address.

17. A message processing system in a multi-homing access overlay network, comprising:
- an edge device described according to claim 8, and
- an egress edge device comprising:
  - a receiving apparatus, configured to: receive a data message carrying overlay encapsulation sent by an ingress edge device; and
- a storage apparatus, configured to: after the data message sent by the edge device is received, when data messages sent by multiple edge devices carry the identifiers indicating the data messages are from the multi-homing access and internal layer source MACs of the data messages are same, then storing a mapping relationship between one same MAC address and multiple overlay network device identifiers in the data messages;
- wherein in the multi-homing access overlay network, the ingress edge device accesses the multi-homing access overlay network through two or more than two links.

* * * * *